United States Patent
Duan et al.

(10) Patent No.: US 7,124,472 B2
(45) Date of Patent: Oct. 24, 2006

(54) HINGE MECHANISM WITH SINGLE HAND OPERATION

(75) Inventors: Chao Duan, Shenzhen (CN); Rui-Hao Chen, Shenzhen (CN); Chia-Hua Chen, Tu-Cheng (TW)

(73) Assignee: FIH Co., Ltd., Taipei Hsien (TW)

( * ) Notice: Subject to any disclaimer, the term of this patent is extended or adjusted under 35 U.S.C. 154(b) by 0 days.

(21) Appl. No.: 11/020,059

(22) Filed: Dec. 21, 2004

(65) Prior Publication Data

US 2005/0204508 A1    Sep. 22, 2005

(30) Foreign Application Priority Data

Mar. 19, 2004    (TW) ............... 93204182 U

(51) Int. Cl.
*E05F 1/14*    (2006.01)

(52) U.S. Cl. .......................................... 16/303; 16/325

(58) Field of Classification Search ................. 16/325, 16/326, 303, 304, 307, 312, 317, 340–342, 16/356, 328, 244, 264; 361/683, 803; 379/433.11–433.13, 379/434, 433, 428; 455/90, 550, 556, 575
See application file for complete search history.

(56) References Cited

U.S. PATENT DOCUMENTS

| | | | |
|---|---|---|---|
| 3,292,204 A * | 12/1966 | Tansey ........................ 16/263 |
| 5,165,145 A * | 11/1992 | Sherman ....................... 16/341 |
| 5,398,378 A * | 3/1995 | Lin .............................. 16/303 |
| 5,923,751 A * | 7/1999 | Ohtsuka et al. ........ 379/433.13 |
| 5,987,122 A * | 11/1999 | Daffara et al. ......... 379/433.13 |
| 6,175,990 B1 * | 1/2001 | Kato et al. ..................... 16/334 |
| 6,292,980 B1 | 9/2001 | Yi et al. |
| 6,634,061 B1 * | 10/2003 | Maynard ....................... 16/342 |
| 6,647,593 B1 * | 11/2003 | Iguchi et al. ................... 16/386 |
| 6,766,180 B1 * | 7/2004 | Doraiswamy et al. ... 455/575.1 |
| 6,886,221 B1 * | 5/2005 | Minami et al. ................ 16/324 |
| 2005/0097705 A1 * | 5/2005 | Chen ............................ 16/326 |

* cited by examiner

*Primary Examiner*—Robert J. Sandy
*Assistant Examiner*—Andre L. Jackson
(74) *Attorney, Agent, or Firm*—Tim Tingkang Xia; Morris Manning Martin LLP

(57) ABSTRACT

A hinge mechanism includes a shaft having an outer screw thread, a rotating cam, a rotating cam having an inner screw thread, a first elastic element, a sleeve having a latching block, a second elastic element, an anchoring block, and a button having a post. The driven cam defines two symmetrical latching grooves. The anchoring block defines a first hole and a second hole. The shaft extends through the rotating cam, the driven cam, the first elastic element, the sleeve, the second elastic element, and the first hole of the anchoring block. The outer screw thread of the shaft engages with the inner screw thread of the rotating cam. The latching block of the sleeve is slidably received in the latching grooves of the driven cam. The post of the button extends through the second hole of the anchoring block and abuts against an end of the sleeve.

21 Claims, 5 Drawing Sheets

HINGE MECHANISM WITH SINGLE HAND OPERATION

CROSS-REFERENCE TO RELATED APPLICATIONS

This application is related to U.S. patent application Ser. No. 10/920,760, entitled "HINGE ASSEMBLY FOR FOLDABLE ELECTRONIC DEVICE" and filed on Aug. 17, 2004. The disclosure of the above identified applications is incorporated herein by reference.

BACKGROUND OF THE INVENTION

1. Field of the Invention

The present invention generally relates to an apparatus for hinging together the housings of a foldable, portable communication device such as a handheld radiotelephone, and in particular to a hinging apparatus which facilitates opening and closing of the device.

2. Prior Art

Portable radiotelephones generally have two housings joined by a type of hinge that allows the housings to fold upon one another. Many such foldable radiotelephones have most of the electronics in one housing, called the main housing, and a few electronics in the other housing, called the cover. Other such foldable radiotelephones have all the electronics in the main housing, with the cover serving only to cover a keypad and a display of the main housing. Manufacturers are constantly seeking to reduce the volume, size and weight of these portable radiotelephones. Thus, it is desirable that the hinge coupling the main housing with the cover is modularized and miniaturized. A modularized hinge device has moving parts such as a cam member, a cam follower and a spring held together in a unified structure. The structure is easily and quickly attached to the main housing and the cover during mass production. A miniaturized hinge device has as few parts as possible, with the parts being as small as practicable.

U.S. Pat. No. 6,292,980 describes a mechanism for a foldable mobile phone. The mechanism includes a cam having a concave portion, a shaft having a convex portion, and a spring which makes the concave portion tightly contact the convex portion. The cam, the shaft and the spring are received in a housing. A flip cover rotates about a main body of the mobile phone by overcoming the force of the spring, to make the concave portion rotate about the convex portion. However, a user must open the mobile phone using both hands. This makes the mobile phone awkward to utilize in situations when the user has only one hand free.

Therefore, a new hinge mechanism is desired in order to overcome the above-described shortcoming.

SUMMARY OF THE INVENTION

Accordingly, an object of the present invention is to provide a hinge mechanism for attaching the housings of a flip type mobile phone together; and in particular, a hinge mechanism that is operated conveniently.

To achieve the above-mentioned object, a hinge mechanism of the present invention is for joining a flip cover to a main body of a flip type mobile phone. The hinge mechanism includes a shaft, a rotating cam, a driven cam, a first elastic element, a sleeve, a second elastic element, an anchoring block, and a button. The shaft defines an outer screw thread. The rotating cam has an inner screw thread. The driven cam defines two symmetrical latching grooves in a circumferential wall thereof. The sleeve includes a latching block at an end thereof. The anchoring block defines a first hole and a second hole. The button has a post. The shaft extends through the rotating cam, the driven cam, the first elastic element, the sleeve, the second elastic element, and the first hole of the anchoring block. The outer screw thread of the shaft engages with the inner screw thread of the rotating cam. Opposite ends of the first elastic element abut against the shaft at the outer screw thread thereof and one end of the sleeve at the latching block. Opposite ends of the second elastic element abut against the driven cam and the anchoring block. The latching block of the sleeve is slidably received in the latching grooves of the driven cam. The post of the button extends through the second hole of the anchoring block and abuts against an opposite end of the sleeve.

When the hinge is installed in the mobile phone, opening and closing the flip cover is easy. The user need only press the button momentarily, whereupon the flip cover automatically rotates to a fully open position. Similarly, the user need only manually rotate the flip cover a predetermined angle toward a closed position, whereupon the flip cover automatically rotates to the fully closed position.

Other objects, advantages and novel features of the invention will become more apparent from the following detailed description when taken in conjunction with the accompanying drawings, in which:

DETAILED DESCRIPTION OF THE INVENTION

Figure 1:
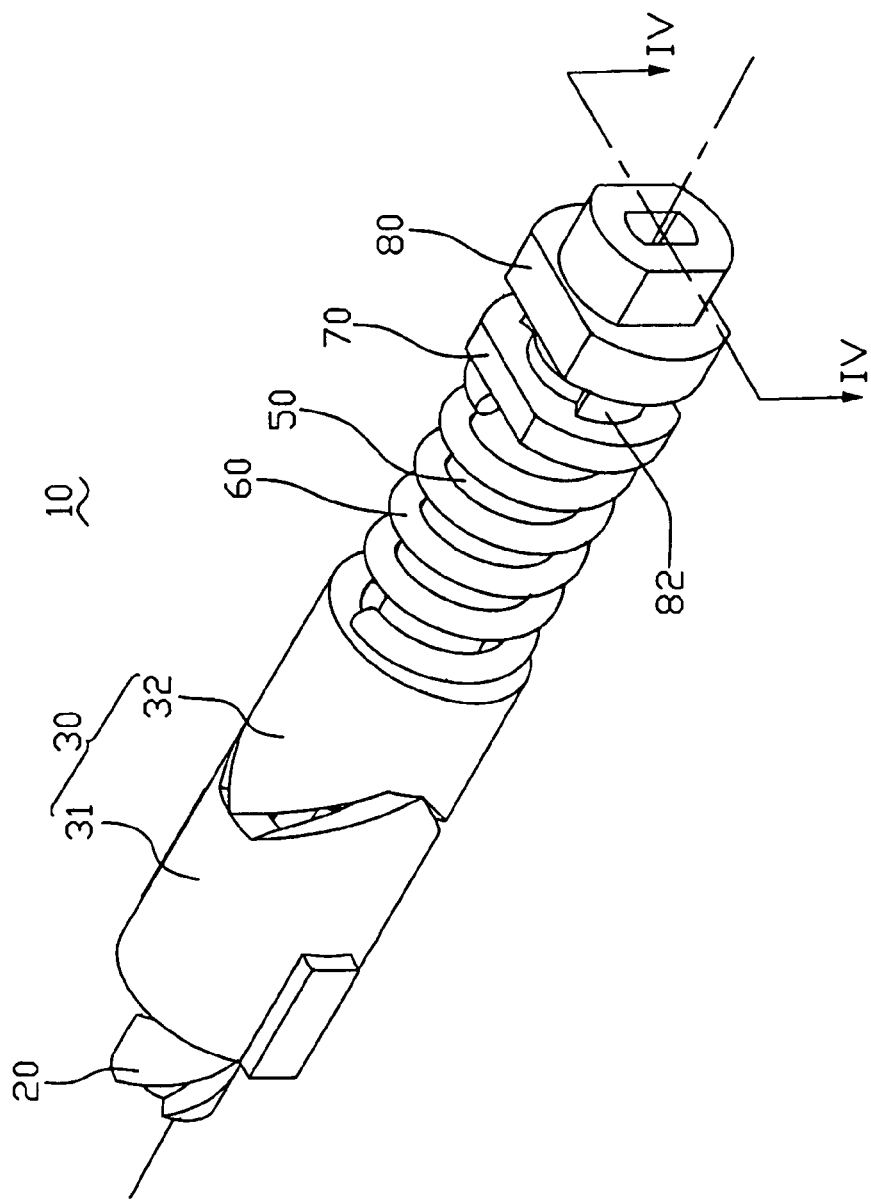
FIG. 1 is an isometric view of a hinge mechanism in accordance with a preferred embodiment of the present invention.
Figure 2:
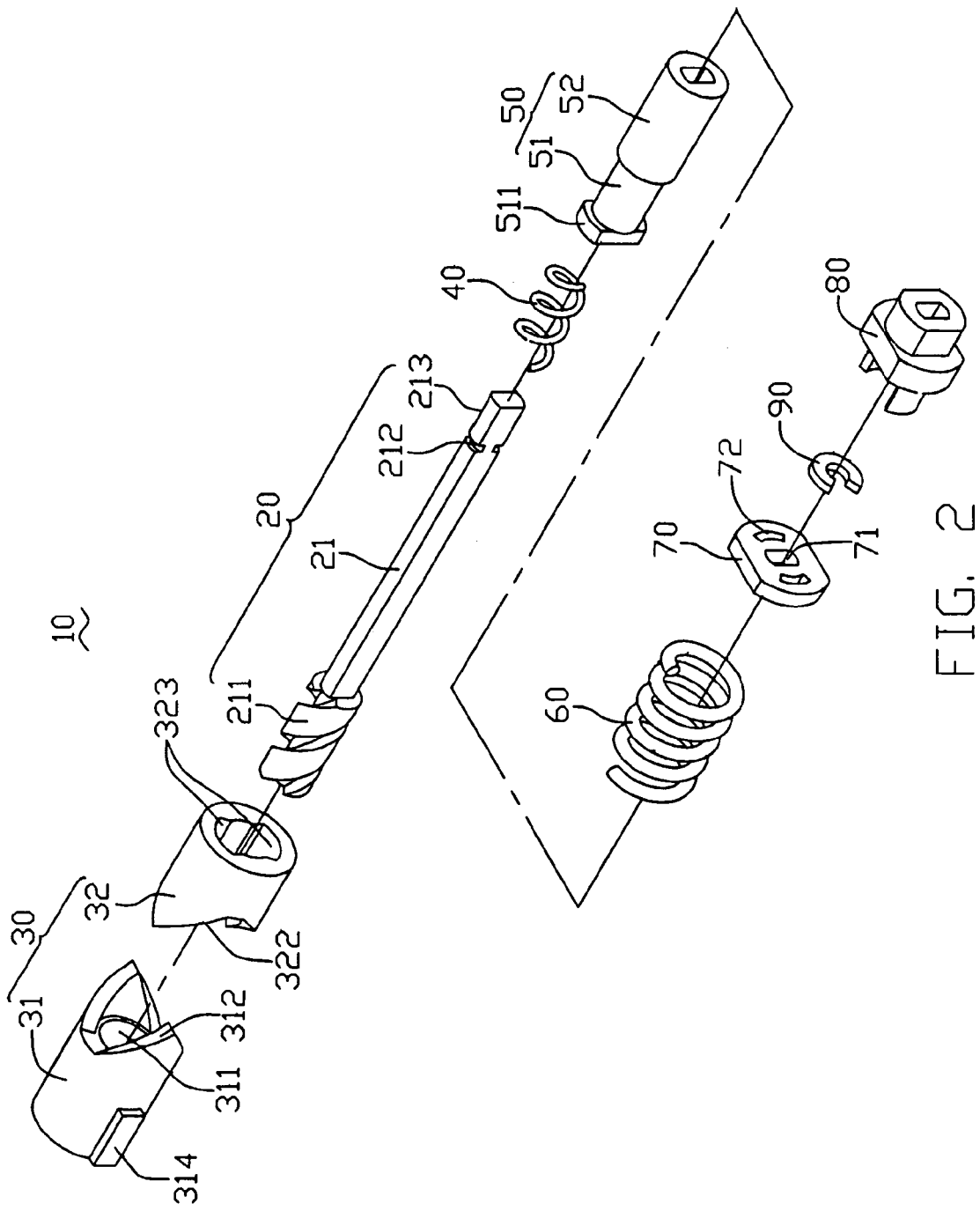
FIG. 2 is an exploded view of FIG. 1.

Referring now to the drawings in detail, FIGS. 1 and 2 show a hinge mechanism 10 for joining a component, like a flip cover, to another, like a main body of a handheld electronic device like a flip type mobile phone (not shown). The hinge mechanism 10 comprises a shaft 20, a rotating element 30, a first coil spring 40, a sleeve 50, a second coil spring 60, an anchoring block 70, a button 80 and a spring clip 90. The rotating element 30, the springs 40, 60, the sleeve 50, the anchoring block 70 and the button 80 are placed around the shaft 20 and assembled together thereat. The shaft 20 connects with the rotating element 30 by way of screw thread engagement.

The shaft 20 includes a body 21. The body 21 has an enlarged first end. An outer screw thread 211 is formed on the first end. A pair of latching slots 212 and a sliding groove 213 are defined in an opposite second end of the body 21.

Figure 3:
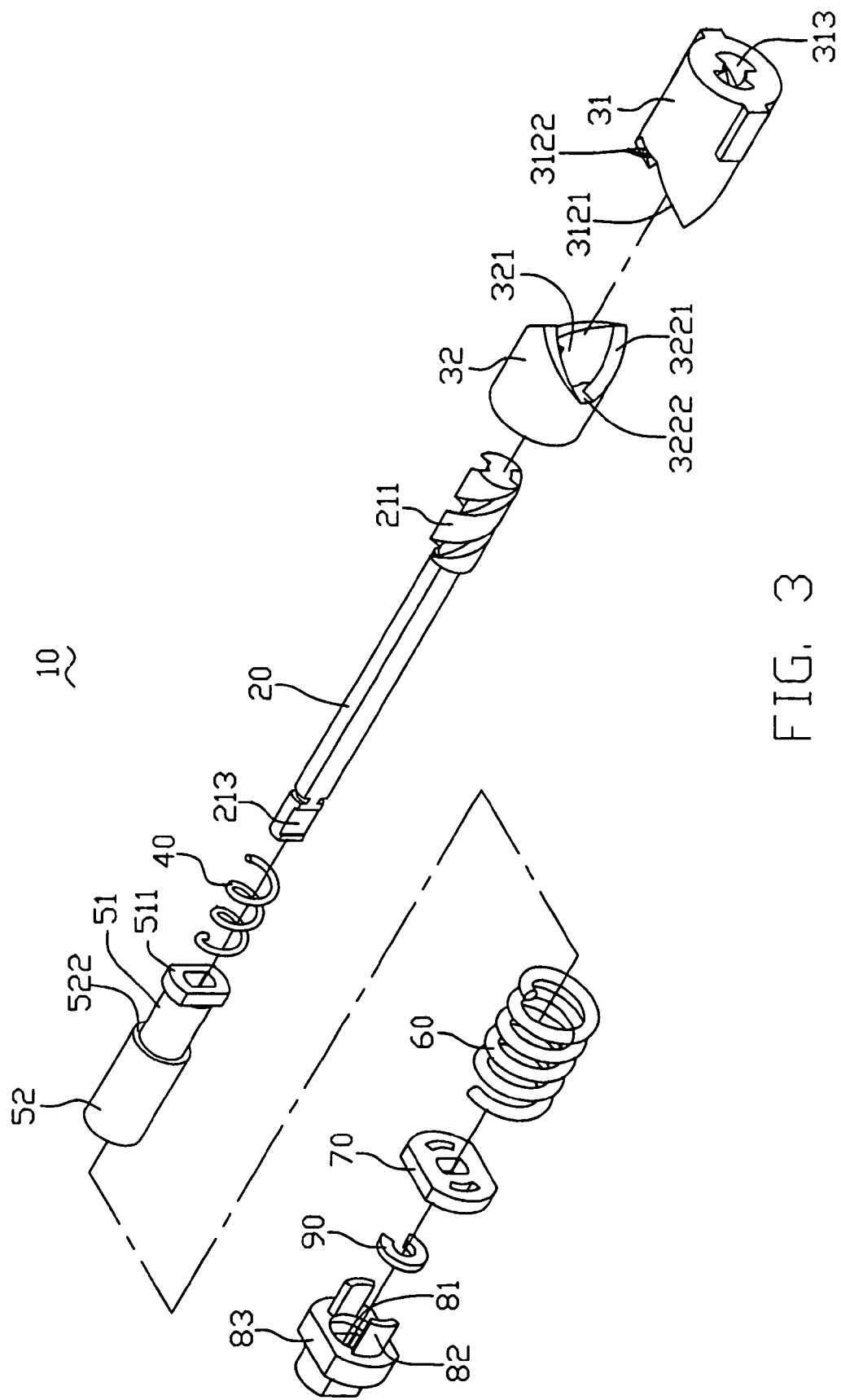
FIG. 3 is similar to FIG. 2, but viewed from another aspect.

Referring also to FIG. 3, the rotating element 30 is received in a corresponding receiving groove of the flip cover of the mobile phone, and moves along the shaft 20. The rotating element 30 includes a rotating cam 31 and a driven cam 32. The rotating cam 31 is essentially a hollow cylinder. The rotating cam 31 defines a first central hole 311, and a first cam surface 312 at an end thereof. The first central hole 311 has an inner screw thread 313 thereat. The first cam surface 312 includes two opposite first convex portions 3121, and two opposite first concave portions 3122. The rotating cam 31 also has a pair of protruding blocks 314, for preventing the rotating element 30 from rotating in the flip cover. The driven cam 32 is essentially a hollow cylinder. The driven cam 32 defines a second central hole 321, and a second cam surface 322 at an end thereof. The second central hole 321 is aligned coaxially with the first central hole 311, and in effect communicates with the first central hole 311. Two symmetrically opposite latching grooves 323 are defined in an inner wall of the driven cam 32, in communication with the second central hole 321. The second cam surface includes two opposite second convex portions 3221, and two opposite second concave portions 3222. The second cam surface 322 engages with the first cam surface 312.

The first spring 40 is placed around the shaft 20 and received in the first central hole 311 and the second central hole 321 of the rotating element 30. One end of the first spring 40 resists an inmost step of the first end of the body 21.

The sleeve 50 is placed around the shaft 20, and can move therealong. The sleeve 50 includes a first portion 51 and a second portion 52. An outer diameter of the second portion 52 is larger than an outer diameter of the first portion 51, thereby defining a step 522 where the second portion 52 adjoins the first portion 51. The first portion 51 includes an enlarged latching block 511 at a distal end thereof, for engaging in the latching grooves 323. Thus the first portion 51 of the sleeve 50 can slide within the second central hole 321 of the driven cam 32, with the latching block 511 resisting the other end of the first spring 40. The step 522 stops the second portion 52 from moving into the second central hole 321.

The second spring 60 is placed around the shaft 20. One end of the second spring 60 resists the driven cam 32.

The anchoring block 70 is secured in a receiving groove of the main body of the mobile phone, and resists the other end of the second spring 60. The anchoring block 70 defines a central first hole 71, and two second holes 72 at symmetrically opposite sides of the first hole 71 respectively. The first hole 71 and the first central hole 311 are aligned coaxially with each other.

The button 80 includes a main board 83, a central hole 81, and two symmetrically opposite posts 82 extending in a same direction from the main board 83. The central hole 81 and the first hole 71 are aligned coaxially with each other. The posts 82 correspond to the second holes 72. A positioning block 84 (see FIG. 4) is formed on an inner wall of the button 80 in the central hole 81. The positioning block 84 engages in the sliding groove 213 of the shaft 20, for limiting movement of the button 80. The button 80 can protrude out from a hole defined in a sidewall of the main body of the mobile phone. The main board 83 engages with a bead formed in said hole of the main body, to stop the button 80 from popping out of the mobile phone.

Figure 4:
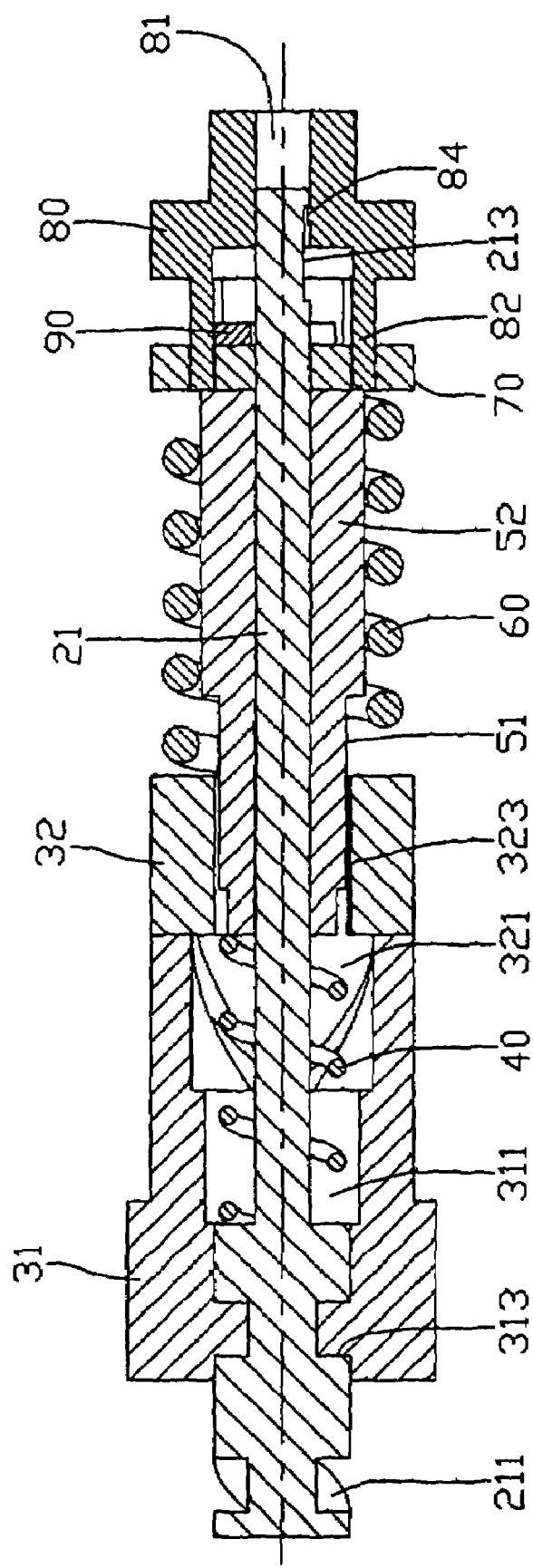
FIG. 4 is a cross-sectional view taken along line IV—IV of FIG. 1, showing the hinge mechanism in a first position.
Figure 5:
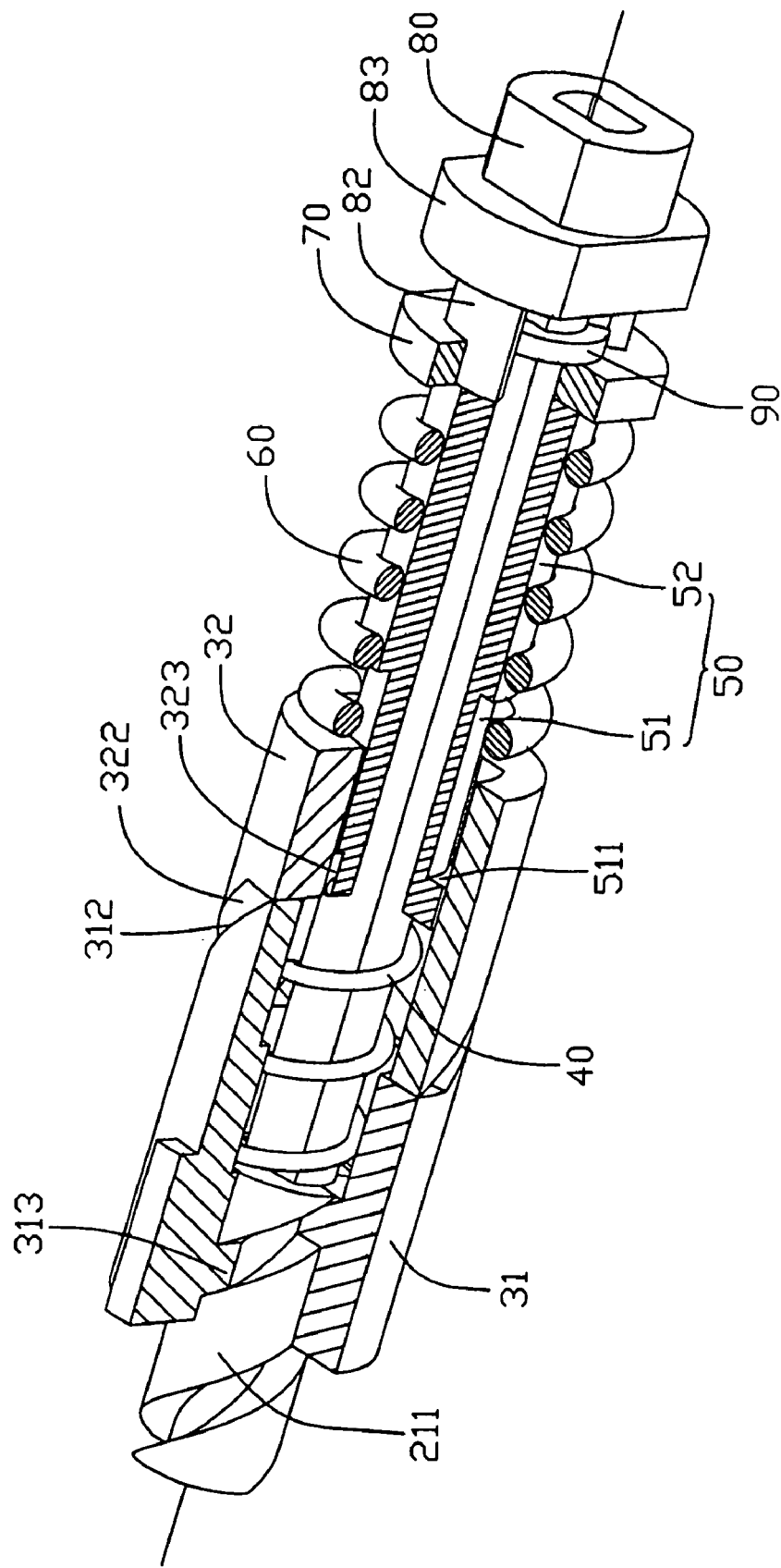
FIG. 5 is essentially a cut-away view of FIG. 1.

Referring also to FIG. 4 and FIG. 5, in assembly, the shaft 20 is passed through the first central hole 311 of the rotating cam 31, the second central hole 321 of the driven cam 32, the first spring 40, the sleeve 50, the second spring 60, the first hole 71 of the anchoring block 70 and the central hole 81 of the button 80 in that order. The spring clip 90 is engaged in the latching slots 212 of the shaft 20. The outer screw thread 211 of the shaft 20 engages with the inner screw thread 313 of the rotating cam 31. The posts 82 are slidably received through the second holes 72 of the anchoring block 70, and resist the second portion 52 of the sleeve 50. At this time, the second spring 60 is in a compressed state, and resists the driven cam 32 of the rotating element 30. The axial force thus produced gives the rotating element 30 a tendency to move and rotate along the shaft 20. However, the latching block 511 of the sleeve 50 is held in the latching grooves 323 of the driven cam 32, which limits the movement and rotation of the rotating element 30.

In use, when a user wants to open the flip cover of the mobile phone, he/she presses the button 80. This makes the posts 82 push the second portion 52 of the sleeve 50, which makes the sleeve 50 slide in a first axial direction and compress the first spring 40. The button 80 is pressed continuously until the latching block 511 of the sleeve 50 exits from the latching grooves 323 of the driven cam 32. The rotating element 30 is thereby released. The rotating element 30 moves along the first axial direction and rotates under the spring force of the second spring 60 and by reason of the engagement between the inner screw thread 313 of the rotating cam 31 and the outer screw thread 211 of shaft 20. The latching block 511 of the sleeve 50 abuts against the driven cam 32 under the spring force of the spring 40. The rotating element 30 continues to thus move and rotate. When the latching grooves 323 of the driving cam 32 is aligned with the latching block 511 of the sleeve 50, the latching blocks 511 of the sleeve move along the second axial direction and engage into the latching groove 323 under the spring force of the spring 40. Then the rotating element 30 stop rotating and moving. The sleeve 50 moves along the second axial direction and push the posts 82 of the button 80 until the button 80 and the sleeve 50 is in its original state. The flip cover is thereby rotated to an open position.

When the user wants to close the flip cover, he/she manually rotates the flip cover. The rotating element 30 rotates along with the flip cover and moves along a second axial direction opposite to the first axial direction. That is, the rotating cam 31 rotates together with the flip cover, but the driven cam 32 cannot rotate because of the latching blocks 511 being engaged in the latching grooves 323. The driven cam 32 only moves along the second axial direction by reason of the interfering engagement between the first cam surface 312 of the rotating cam 31 and the second cam surface 322 of the driven cam 32. In this process, the driven cam 32 compresses the second spring 60. Once the first convex portions 3121 of the first cam surface 312 have ridden over peaks of the second convex portions 3221 of the second cam surface 322, the first convex portions 3121 has a tendency to slide along the second surface 322 toward to the second concave portions 3222. That is, the user can release the flip cover, and the rotating cam 31 continues to rotate along the shaft 20. The driven cam 32 slides back along the first axial direction under the spring force of the spring 60 until the second convex portions 3221 engage with the first concave portions 3122. That is, the flip cover returns to its original closed position.

As described above, the user need only press the button momentarily, whereupon the flip cover automatically rotates to the fully open position. Similarly, the user need only manually rotate the flip cover a predetermined angle toward the closed position, whereupon the flip cover automatically rotates to the fully closed position.

In alternative embodiments, the springs 40, 60 can be replaced by another kind of elastic element or urging mechanism. The rotating cam 31 and the driven cam 32 can be integrally formed. Preferably, in such case, the rotating element 30 is still essentially a hollow cylinder. A central hole of such rotating element 30 has an inner screw thread and at least one latching groove.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge mechanism for joining a flip cover to a main body of a foldable mobile phone, comprising:
    a shaft having an outer screw thread;
    a rotating cam having an inner screw thread;
    a driven cam defining two symmetrical latching grooves in an inner wall thereof;
    a first elastic element;
    a sleeve including at least one latching block;
    a second elastic element;
    an anchoring block defining a first hole and at least one second hole; and
    a button having at least one post;
    wherein the shaft extends through the rotating cam, the driven cam, the first elastic element, the sleeve, the second elastic element and the first hole of the anchoring block, the outer screw thread of the shaft engages with the inner screw thread of the rotating cam, opposite ends of the first elastic element respectively abut against the shaft at the outer screw thread thereof and one end of the sleeve at said latching block, opposite ends of the second elastic element respectively abut against the driven cam and the anchoring block, said latching block of the sleeve is slidably received in the latching grooves of the driven cam, and said post of the button extends through said second hole of the anchoring block and abuts against an opposite end of the sleeve.

2. The hinge mechanism as claimed in claim 1, wherein the rotating cam defines a first central hole and a first cam surface at an end thereof, and said inner screw thread is located in the first central hole.

3. The hinge mechanism as claimed in claim 2, wherein the driven cam defines a second central hole and a second cam surface at an end thereof, the latching grooves communicate with the second central hole, and the second earn surface movably engages with the first cam surface.

4. The binge mechanism as claimed in claim 2, wherein the rotating cam has a plurality of protruding blacks located on an outer circumferential wall thereof.

5. The hinge mechanism as claimed in claim 3, wherein the sleeve slides along the shaft and includes a first portion and a second portion, said latching block is located on one end of the first portion, and the first portion is slidably received in the second central hole and abuts against one end of the first elastic element.

6. The binge mechanism as claimed in claim 5, wherein an outer diameter of the second portion is larger than an outer diameter of the first portion, thereby defining a step where the second portion adjoins the first portion.

7. The hinge mechanism as claimed in claim 1, wherein an end of the shaft distal from the outer screw thread defines at least one latching slot and a sliding groove.

8. The hinge mechanism as claimed in claim 7, further comprising a spring clip engaged in said latching slot and abutting against the anchoring block.

9. The hinge mechanism as claimed in claim 8, wherein the button defines a central hole, and a positioning block is formed on an inner wall of the button in the central hole.

10. The hinge mechanism as claimed in claim 9, wherein the positioning block engages in the sliding groove of the shaft, for limiting a range of movement of the button along the shall.

11. A hinge mechanism for joining a flip cover to a main body of a foldable device, comprising:
    a shaft having an outer screw thread on one end thereof;
    a rotating cam having an inner screw thread and defining at least one latching groove;
    a first elastic element;
    a sleeve including a latching block;
    a second elastic element;
    an anchoring block defining a first hole and a second hole; and
    a button having a post;
    wherein the shaft extends through the rotating cam, the first elastic element, the sleeve, the second elastic element and the first hole of the anchoring block, the outer screw thread of the shaft engages with the inner screw thread of the rotating cam, opposite ends of the first elastic element respectively abut against the shaft at the outer screw thread thereof and one end of the sleeve at the latching block, opposite ends of the second elastic element respectively abut against the driven cam and the anchoring block, the latching block of the sleeve is slidably received in said latching groove of the rotating cam, and the post of the button extends through the second hole of the anchoring block and abuts against an opposite end of the sleeve.

12. The hinge mechanism as claimed in claim 11, wherein the rotating cam defines a first central hole and a first cam surface at an end thereof, the inner screw thread is located in the first central hole, and said latching groove is in communication with the first central hole.

13. The hinge mechanism as claimed in claim 12, wherein the rotating earn has a plurality of protruding blocks located on a circumferential wall thereof.

14. The hinge mechanism as claimed in claim 12, wherein the sleeve slides along the shalt and includes a first portion and a second portion, the first portion includes the latching block at a distal end thereof, and the latching block abuts against one end of the first elastic element.

15. The hinge mechanism as claimed in claim 14, wherein an outer diameter of the second portion is larger than an outer diameter of the first portion, thereby defining a step where the second portion adjoins the first portion.

16. The hinge mechanism as claimed in claim 11, wherein an opposite end of the shaft defines a sliding groove and at least one latching slot.

17. The hinge mechanism as claimed in claim 16, further comprising a spring clip engaged in said latching slat and abutting against the anchoring block.

18. The hinge mechanism as claimed in claim 16, wherein the button defines a central hole, a positioning block is formed on an inner wall of the button in the central hole, and the positioning block engages in the sliding groove of the shaft for limiting a range of movement of the button along the shaft.

19. A hinge mechanism for joining components of an electronic device, comprising:
    a shaft interconnected with one of components of an electronic device to move together therewith;
    a rotating cam interconnected with another of said components to move together therewith, said rotating cam engagable with said shaft and linearly movable along said shaft and rotarily movable about said shaft during engagement of said shaft and said rotating cart; and a sleeve reachable to said rotating cam and movable between a first position thereof to release said rotating cam and allow said rotating cam to linearly and rotarily move relative to said shaft, and a second position thereof to confine movement of said rotating cam;

wherein said shalt engages with said rotating cam via an outer screw thread thereof so as to guide said movement of said rotating cam by means of said outer screw thread.

20. The hinge mechanism as claimed in claim 19, wherein said sleeve is attached to said shaft and linearly movable along said shaft by driving of a button.

21. The binge mechanism as claimed in claim 19, further comprising a driven cam only linearly movable along said shaft, and engagable with said rotating cam at one end thereof next to said rotating cam and with said sleeve at the other end thereof away from said rotating cam.

* * * * *